June 26, 1928.
C. L. WHITE
1,675,203
SIGNALING DEVICE FOR AUTOMOBILES
Filed April 14, 1924        6 Sheets-Sheet 1
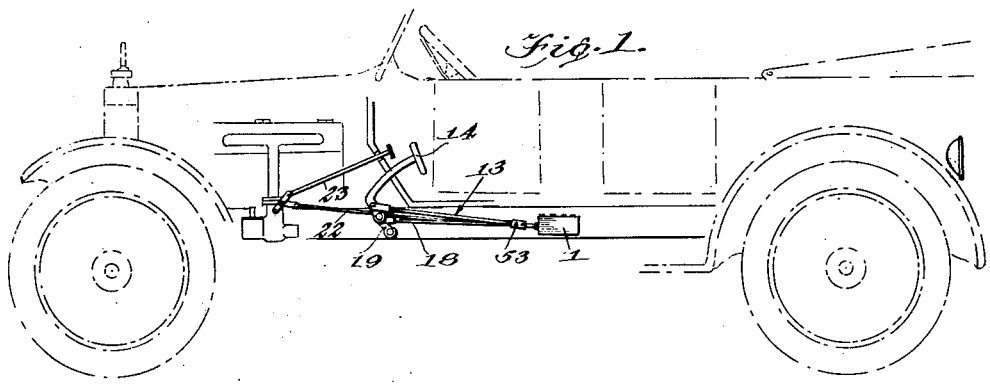
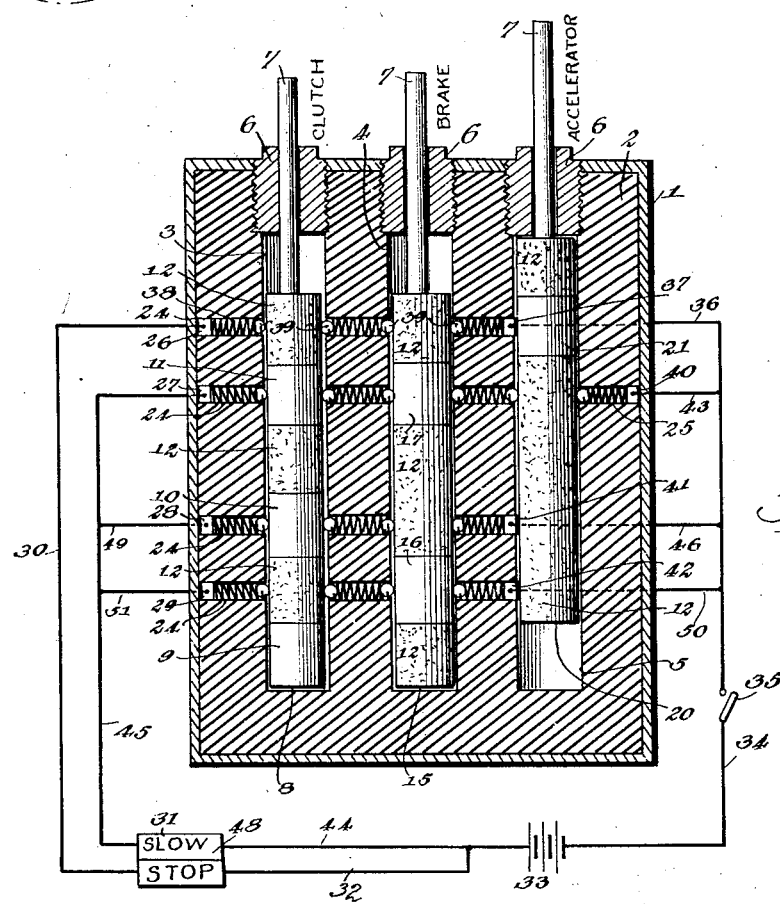
WITNESSES
INVENTOR
Charles L. White
BY
ATTORNEYS June 26, 1928. 1,675,203
C. L. WHITE
SIGNALING DEVICE FOR AUTOMOBILES
Filed April 14, 1924 6 Sheets-Sheet 2
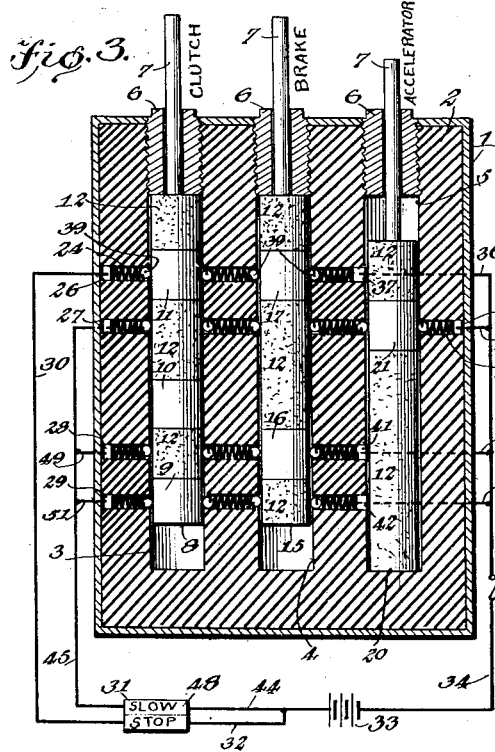
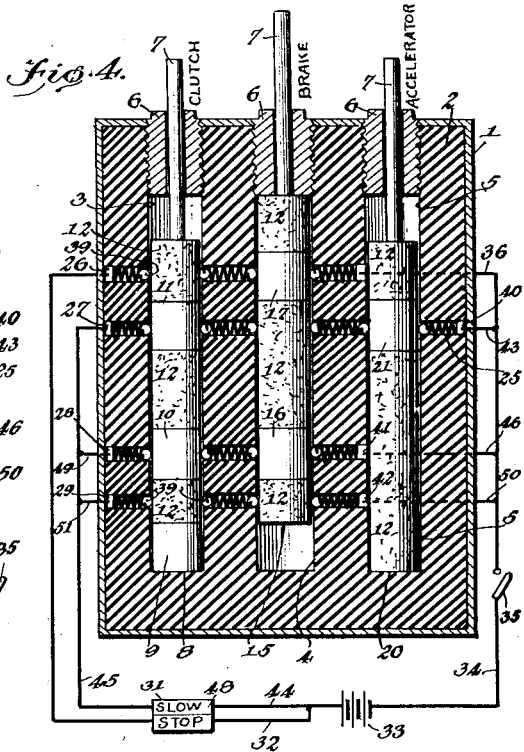
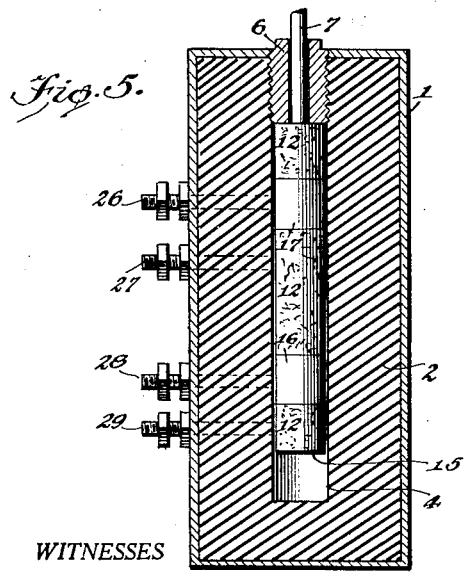
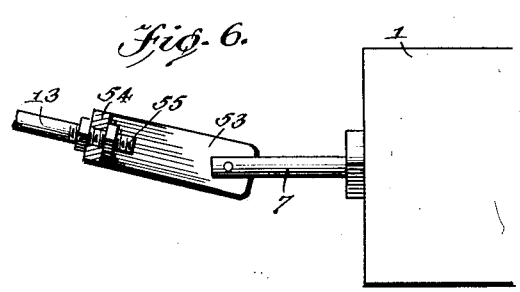
WITNESSES
INVENTOR
Charles L. White,
BY
ATTORNEYS June 26, 1928.

C. L. WHITE 1,675,203

SIGNALING DEVICE FOR AUTOMOBILES

Filed April 14, 1924       6 Sheets-Sheet 3

WITNESSES

Lawrence O. Mankin

Harry E. Seidel

INVENTOR
Charles L. White,
BY
ATTORNEYS

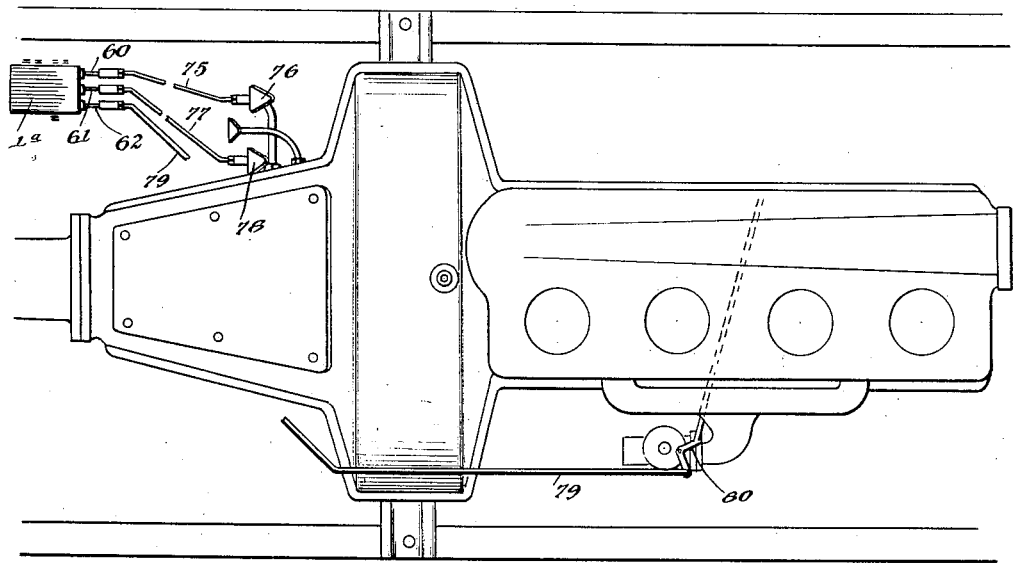
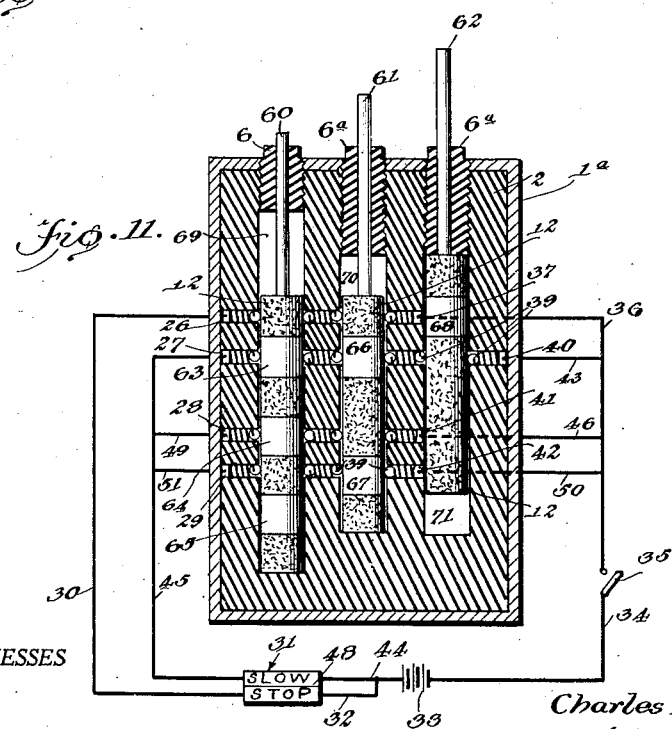

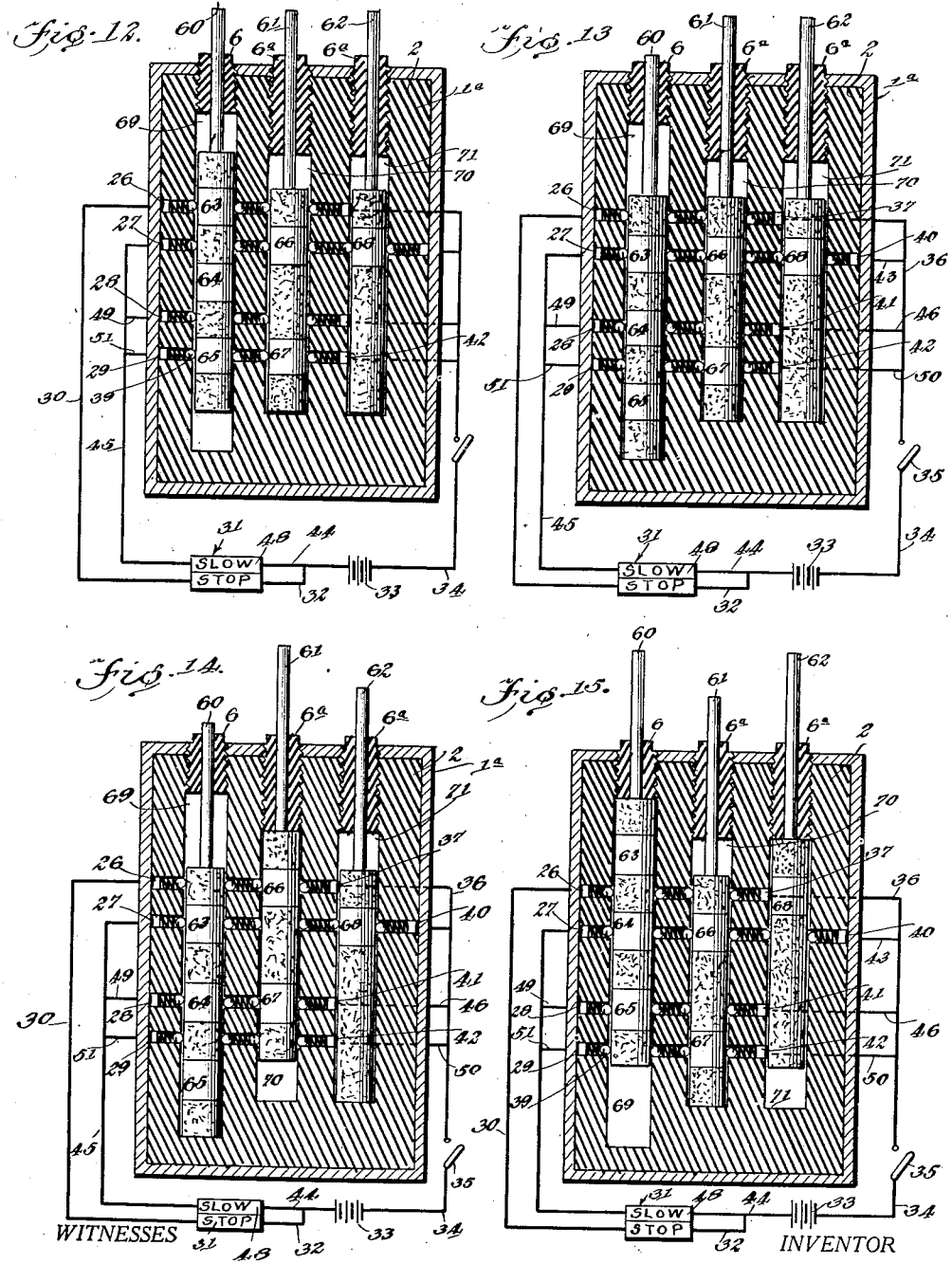

June 26, 1928.
C. L. WHITE
1,675,203
SIGNALING DEVICE FOR AUTOMOBILES
Filed April 14, 1924   6 Sheets-Sheet 6
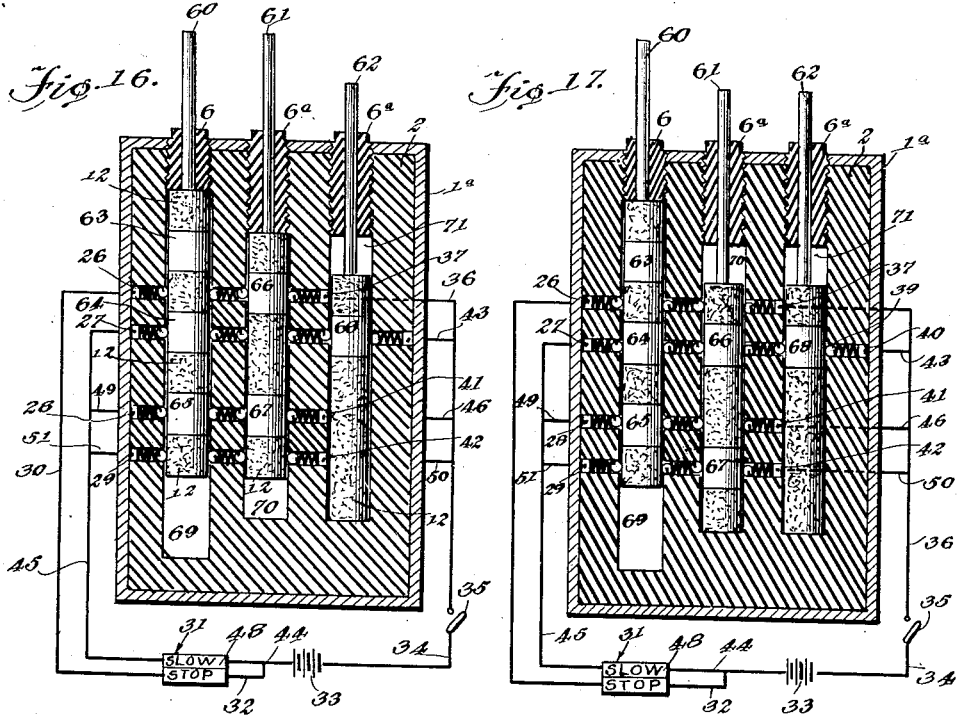
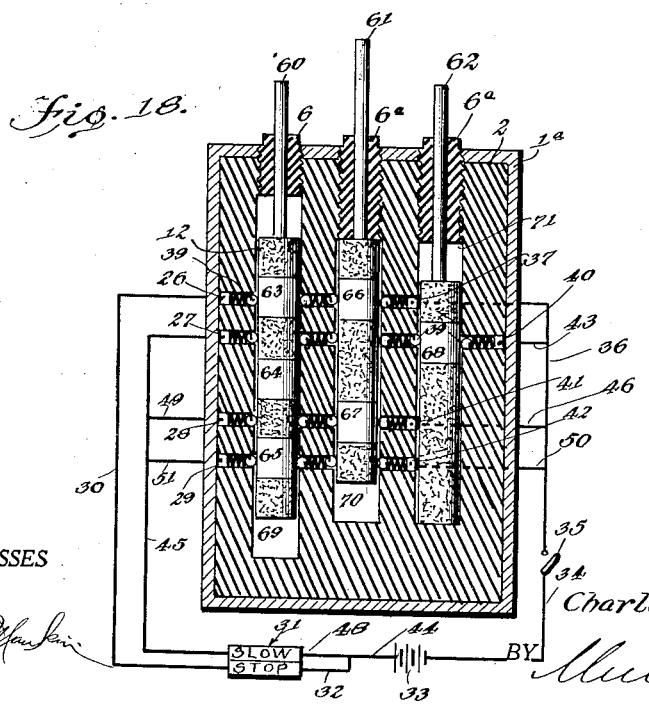
WITNESSES
INVENTOR
Charles L. White,
BY
ATTORNEYS Patented June 26, 1928.

1,675,203

UNITED STATES PATENT OFFICE.

CHARLES L. WHITE, OF ST. LOUIS, MISSOURI.

SIGNALING DEVICE FOR AUTOMOBILES.

Application filed April 14, 1924. Serial No. 706,485.

This invention relates to signaling devices for automobiles and has for its object the provision of a device adapted to be automatically operated by some form of control which effects a change in the speed of the automobile for warning the traffic that a change in the speed of the automobile is about to be made which will materially affect the progress of not only the automobile to which the signal has been applied but automobiles which are closely associated with the traffic.

A further object of the invention is the provision of a signaling device adapted to be automatically operated for displaying visual signals to the traffic, which signals are controlled through a switch box having individual switches operated by the various controls.
This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view of an automobile showing my invention applied thereto.

Figure 2 is a horizontal section of the switch box showing the position of the switches when the automobile is normally running.

Figure 3 is a horizontal section of the switch box showing the position of the switches when the automobile is suddenly stopped.

Figure 4 is a similar section showing the position of the switches when the automobile is stopped slowly.
Figure 5 is a vertical section of the switch box showing the position of the plunger of a switch unit in position with the brakes applied.

Figure 6 is a fragmentary view in detail of the connection between one of the controls and a switch plunger.

Figure 8 is a similar section of the switch box showing the position of the plunger switches during coasting of the automobile with the clutch in.

Figure 10 is a fragmentary plan view of a Ford chassis showing the engine in position.

Figure 11 is a horizontal sectional view of a modified form of circuit closer shown in Figures 1 to 9.

Figure 7:
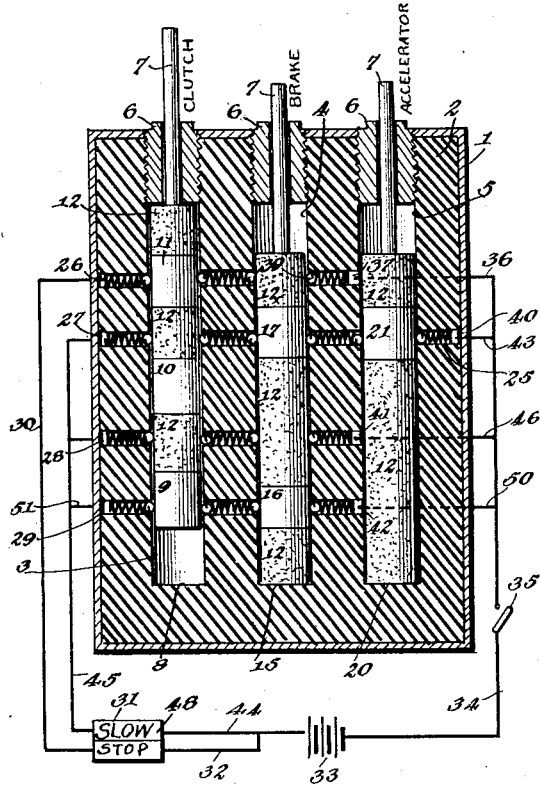
Figure 7 is a horizontal section of the switch box showing the plunger switches in position during the coasting of the automobile with the clutch out.

Figures 12 to 18 inclusive are similar sections showing the plungers in different positions to produce different signals.

Referring more particularly to the drawings, 1 designates a casing or switch box adapted to be secured to a fixed part of an automobile and in a position which will be convenient for attaching links which are connected to the brake, clutch and accelerator pedals for operating switches in the switch box for automatically controlling visual signals mounted on the car. The casing 1 is provided with a block of insulating material 2 which completely fills the casing and is provided with longitudinal bores 3, 4 and 5. The outer ends of the bores are closed by an insulating plug 6 which has a longitudinal passage through which is slidably mounted an operating rod 7.

Mounted within the bore 3 is a plunger 8 and composed of a plurality of metal cylindrical contact members 9, 10 and 11 which are separated from each other by insulating sections 12. The rod 7, which is rigidly connected with the plunger 8 through an insulating section 12 is connected by means of a link 13 to the clutch pedal 14.

A plunger 15 is mounted for sliding movement in the bore 4 and has insulating sections 12 separating the metal contact portions 16 and 17. The rod 7 which is rigidly connected to the plunger 15 through an insulating section 12 is connected through a link 18 to a brake pedal 19. A plunger 20 slidable in the bore 5 has a metal contact member 21 embraced upon opposite sides by insulating sections 12. The rod 7 is connected to an insulating member 12 of the sections and through a link 22 is connected with the accelerator pedal 23. The insulating block 2 is provided with restricted passages at right angles to the bores 3, 4 and 5 and these passages connect the bores. The passages 24 extend from the bore 3 through the outer wall of the member 2 and terminate at the side of the casing 1. A passage 25 extends from the bore 5 through the side of the member 2 and terminates upon the opposite side wall of the casing 1.

The outer ends of the passages 24 are supplied with a binding post either designated by one of the numerals 26, 27, 28 or 29. The binding post 26 is connected to a wire 30 which passes through a casing 31 and connected with a lamp which is located adjacent the portion of the casing which discloses the indicia, such as "Stop". A wire 32 is connected with the other terminal of the lamp in the casing and also with one element of a battery 33. A wire 34 is connected with the other element of the battery through a switch 35. A wire 36 connects the wire 34 with a binding post 37 which is adapted to be in engagement with the plunger 15.

Springs 38 located in the passages 24 in direct alinement are adapted to force the spherical contact members 39 in engagement with the plungers, said contact members being adapted to be slightly projected into the bores 3, 4 or 5 as the case may be in order to engage the metallic elements of the plungers 8, 15 or 20. A binding post 40 is located in a passage 25 and in line with a plurality of passages and is likewise provided with the springs 38 and spherical contact members 39 for engaging the various metal contact elements of the plungers. Binding posts 37, 41 and 42 are insulated from the plunger 20 but are in circuit with certain of the contacts 39 and springs 38 for a purpose which will be presently explained.

A lead-in wire 43 connected with the binding post 40 and also with the wire 34 has connections with the battery 33. A wire 44 connects the battery and likewise the wire 34 in circuit with a lamp in that portion of the casing designated by the indicia "Slow". A wire 45 completes the circuit of the lamp and battery to a binding post 27.

A wire 46 has similar connections through the wires 34, battery 33, wire 44 to the lamp in the section 48 of the casing 31. Wire 49 completes the circuit to the binding post 28 through the wire 45.

When the wire 50 connects the binding post 42 with the battery 33 and through the wire 44 to the lamp in the section 48 of the casing, a wire 51 connected to wire 45 completes the circuit to the binding post 29.

Each of the ends of the rods 7 are bifurcated to receive one end of a plate 53 which is pivoted to the rod 7. The other ends of the plates are provided with laterally projecting perforated flanges 54 adapted to receive the threaded ends 55 of the links which connect the various control levers with the rods 7 of the switch plungers in the casing 1.

The operation of my device is as follows:

In Figure 2 the plungers are positioned for the normal running of the automobile with the clutch in and brake off and therefore the plungers 8 and 12 are normally seated at the bottom of their respective bores in the insulating member 2. Since the throttle has been opened the rod 7 connected with the accelerator pedal 23 has been moved outwardly and the plunger 20 is moved to its outward limit of movement. In this position the circuits to the "Slow" and "Stop" signal elements are broken and therefore no signals are disclosed.

It must be borne in mind that the terminals or binding posts 26 and 37 are connected to close the circuit to the "Stop" signal lamp when the metal contact member 11 of plunger 8 and metal contact member 17 of plunger 15 are in alinement with these binding posts, as shown in Figure 3.

In order to close the circuit through the binding posts 27 and 40 it will be necessary that the metal contact member 11 of the plunger 8, metal contact member 17 of plunger 15 and metal contact member 21 of plunger 20 have transverse alinement with these binding posts. When the circuit is closed through the binding posts 27 and 40, as shown in Figure 8, circuit is made through wires 43, 34, 44 and 45 to the lamp in the "Slow" signal casing 48. When metal contact member 10 of plunger 8 and metal contact member 16 of plunger 15 are alined with the binding posts 28 and 41, the circuit is closed to the "Slow" signal 48 through wires 46, 34, 44, 45 and 49, as shown in Figure 4. Again shifting the plungers 8 and 15 so that metal contact section 9 of plunger 8 will have a transverse alinement with the contact member 16 of plunger 15 and binding posts 29 and 42 so that the circuit is closed to the "Slow" signal through wires 50, 34, 44, 45 and 51, as shown in Figure 7, it will be seen that none of these combinations are disclosed in Figure 2 and therefore no signals are displayed.

Referring to Figure 3 it will be seen that if the car is suddenly stopped and the clutch is thrown out with the brakes on an accelerator pedal off that the only circuit which would be completed by the position of the plungers would be the circuit through binding posts 26 and 37 and wires 36, 34, 32 and 30 so that the "Stop" signal will be displayed.

Referring to Figure 4 the plungers are so positioned by throwing the clutch in, the brake on and releasing the accelerator pedal that contact member 10 of plunger 8 and contact member 16 of plunger 15 would be transversely alined with binding posts 28 and 41 so that the circuit will be completed through wires 46, 34, 44, 45 and 49 so that the lamp in the casing 48, designating "Slow" will be lighted and signal to the traffic that the automobile is stopping slowly.

Figure 8:
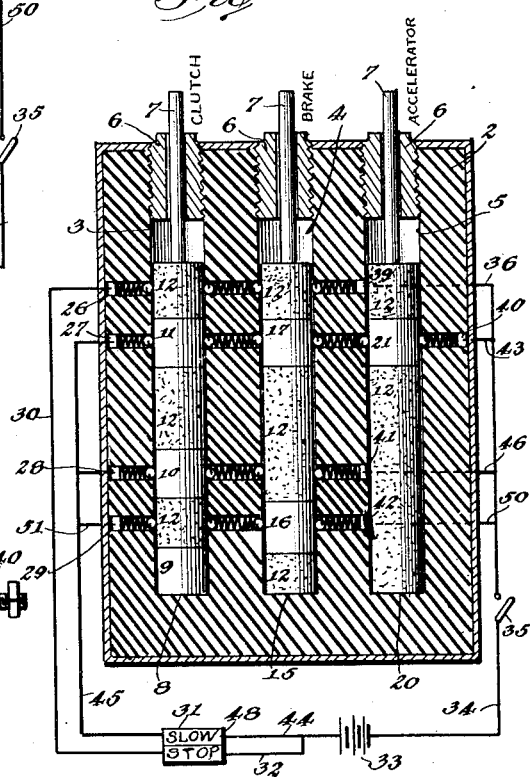
Figure 9:
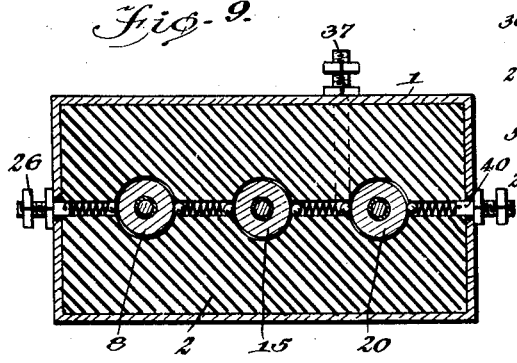
Figure 9 is a transverse vertical section through the switch box and the contact members adapted to engage the plungers forming part of the switch unit.

Referring to Figure 7, during the coasting of the automobile, when the clutch is out and the brakes and accelerator pedals have been released, circuit will be made through the alined contacts 9 and 16, respectively, of plungers 8 and 15 which are transversely alined with binding posts 29 and 42 so that the circuit is completed through wires 50, 34, 44, 45 and 51 thereby closing the circuit to the lamp in casing 48 of the signal and illuminating the "Slow" signal thereby warning the public that a change in speed has been made.

It is not always desirable to coast with the clutch out and therefore in such an emergency I have provided a combination of movements of the plungers whereby a signal will still be shown when the clutch is in and the plunger 8 has been moved to its innermost extent of travel. In this case the three contact members 11, 17 and 21 of the respective plungers 8, 15 and 20 are transversely alined with the binding posts 27 and 40, thereby closing the circuit through wires 43, 34, 44 and 45 to the lamp in the casing designating "Slow" for illuminating said lamp, as shown in Figure 8, and thereby warning the public that the change of control has been made in the operation of the automobile. It must be borne in mind that when any of the individual contact members of the three plungers are alined for closing the circuit between a pair of binding posts the metal balls 39, which operate as contact members, engage the conducting metal of a plunger at those times and the current is transmitted through the member 39 and the springs located between pairs of these spherical contact members located in the various passages 24 of the insulating block 2.

It must also be borne in mind that if in coasting down a hill with the clutch out, the accelerator pedal released to cut out the fuel, the brake applied to control the automobile, a circuit will be closed, as shown in Figure 3, and the "Stop" sign appears to warn the travelling public of a change in control and speed of the automobile.

When the circuit closer is applied to the well known Ford construction, certain changes are necessary for the proper operation of said closer but such changes do not affect the scope of the invention.

In the construction shown in Figures 10 to 18 inclusive, the casing 1ª is secured in any suitable manner to the chassis or engine of a Ford automobile so that the plungers carrying the movable contacts may be readily operated. The casing is provided with a filling of insulating material 2 having longitudinal passages 69, 70 and 71 and which are adapted to receive the plungers. The stem 60 is connected to one of the plungers which is in turn connected through a link 75 to the clutch pedal or high and low gear pedal 76 of the Ford automobile. A stem 61 connected with a plunger slidably mounted in the bore 70, is adapted to be connected by a link 77 to the brake pedal 78. A stem 62 connected to a plunger slidable in the bore 71 is adapted to be connected by means of a link 79 to a bell crank lever 80 which operates the throttle valve of the carburetor.

The plunger slidable in the bore 69 is provided with alternately disposed sections of insulating material 12 and spaced contacts 63, 64 and 65. The plunger slidable in bore 70 is provided with two contacts 66 and 67 maintained in spaced relation by insulating material 12 of cylindrical formation. The plunger slidable in bore 71 has a single contact 68 embraced at opposite ends by insulating material 12. Contact 68 is adapted to engage contacts 63, 64 and 66 when in its innermost position on the spherical contacts 39 which are in circuit with contacts 27 and 40. Contact 66 of the plunger in bore 70 is adapted to engage a pair of spherical conducting members 39 which are in line with the contacts 27 and 40 and are adapted to engage the spherical contacts 39 in line with the contacts 26 and 37. A second contact 67 of this plunger is adapted to alternately engage a pair of contacts 39 in line with contacts 29 and 42 or with a pair of spherical contacts 39 in line with contacts 28 and 41. All the above mentioned spherical contacts are adapted to be placed in circuit by either of the movable contacts 66 or 67. Contact 63 of plunger movable in bore 69 is adapted to aline and engage pairs of spherical contacts slightly projecting into the bore at diametrically opposite points and which are respectively in line with the pairs of contacts 26, 39 and 27, 40. It will be readily seen how contact 65 in cooperation with the contacts of one of the other plungers, is adapted to place contacts 28 and 41 in circuit or contacts 29 and 42 in circuit for causing illumination of the signals at the rear end of the automobile.

A brief reference to the conditions obtained by the various positions of the plungers will be readily explained.

Referring to Figure 11 it will be seen that none of the contacts 63 to 68 inclusive are so alined to close in circuit and in the position of the plungers in the various bores it will be seen that the stem 60 is moved to its position by the clutch being thrown in high gear, stem 61 moves its respective plunger in position by the brake pedal releasing the brakes, while stem 62 has withdrawn its respective plunger by opening the throttle for admitting gas so that the automobile is in the normal running condition and no sign appears.

In Figure 12, the clutch is thrown in neutral and therefore the stem 60 has moved its respective plunger in a position where the pairs of contacts 39 are respectively engaged by the movable contacts 65 and 67 so that the contacts 29 and 42 are in circuit through the wires 34 and 45 with the lamp in the casing 48 and the battery 33 whereby the "Slow" sign is illuminated. The brakes and gasoline are both off so that the plungers connected with the respective stems 61 and 62 are at their innermost position in the respective bores 70 and 71 and the automobile is coasting or standing.

Figure 13 shows the automobile coasting with the clutch in high gear, brake off and the gasoline off. The "Slow" sign is illuminated due to the fact that the three contacts 63, 66 and 68 are alined for closing the circuit between contacts 27 and 40 and the wires 45, 36, 34 to the battery 33 and the lamp in the casing 48.

In Figure 14 the "Slow" signal appears when the automobile is slowly stopping, when the clutch is in high gear, brakes on and the gas is off and contacts 64 and 67 are alined for closing the circuit through the stationary contacts 28 and 41.

In Figure 15 no sign appears, with the automobile running slowly. In this case the clutch is in low gear, the brakes are off and the throttle has been opened to admit gas and none of the contacts are in line for closing any of the circuits.

In Figure 16 the automobile is slowly stopping with the clutch in low gear, brakes on and gasoline off so that contacts 65 and 67 are alined to close the circuit between the stationary contacts 28 and 41.

In Figure 17 the "Slow" sign appears during coasting since when the clutch is in low gear the brakes and gasoline are off and contacts 64, 66 and 68 are alined. This condition may also arise when the automobile is slowly stopping with the clutch in low gear and the brakes off and the gasoline off.

Figure 18 shows the actuation of the "Stop" sign through wires 30, 34, 36 and 32 and stationary contacts 26 and 37 since the movable contacts 63 and 66 are located in alinement when the clutch is in neutral, the brakes are on and the gasoline is off.

What I claim is:

1. In an automobile, the combination of a clutch pedal, a brake pedal and an accelerator pedal, a slow signal, a stop signal switch means including a plurality of movable and stationary switch members, circuit interconnecting means associated with the plurality of stationary switch members and with the slow and stop signals, means connecting each pedal with a different one of the movable members of the switch means, said circuit interconnecting means and switch means cooperating to energize the slow signal when none of the pedals are depressed, and to energize the stop signal alone when both the brake and the clutch pedals are depressed, and to energize neither signal when the accelerator pedal alone is depressed.

2. In an automobile, the combination of a clutch pedal, a brake pedal and an accelerator pedal, a slow signal, a stop signal switch means including a plurality of movable and stationary switch members, circuit interconnecting means associated with the plurality of stationary switch members and with the slow and stop signals, means connecting each pedal with a different one of the movable members of the switch means, said circuit interconnecting means and switch means cooperating to energize the slow signal when none of the pedals are depressed or when the clutch pedal or the brake pedal is depressed without depressing the other of these two pedals, and to energize the stop signal alone when both the brake and the clutch pedals are depressed, and to energize neither signal when the accelerator pedal alone is depressed.

CHARLES L. WHITE.